United States Patent [19]

Liu

[11] Patent Number: 5,023,612

[45] Date of Patent: Jun. 11, 1991

[54] ILLEGAL SEQUENCE DETECTION AND PROTECTION CIRCUIT

[75] Inventor: Kuo-Hui Liu, San Ramon, Calif.

[73] Assignee: Pacific Bell, San Francisco, Calif.

[21] Appl. No.: 379,487

[22] Filed: Jul. 13, 1989

[51] Int. Cl.[5] .......................................... H03M 13/00
[52] U.S. Cl. .................................... 341/94; 371/47.1; 375/116
[58] Field of Search .................... 341/50, 55, 59, 94; 375/106, 108, 116; 371/47

[56] References Cited

U.S. PATENT DOCUMENTS 3,990,049 11/1976 Wirth ............................. 375/116 X
4,169,212 9/1979 Kinch et al. ..................... 375/116 X Primary Examiner—William M. Shoop, Jr.
Assistant Examiner—Brian K. Young
Attorney, Agent, or Firm—McCubbrey, Bartels, Meyer & Ward

[57] ABSTRACT

A circuit for eliminating illegal data sequences from a data stream is disclosed. The circuit examines a portion of an input data stream. The previously received data sequence is then examined. If the previously received data matches an illegal sequence, the stored data is altered. The stored data is then outputted to form an output data sequence.

6 Claims, 4 Drawing Sheets

ILLEGAL SEQUENCE DETECTION AND PROTECTION CIRCUIT

BACKGROUND OF THE INVENTION

The present invention relates to digital transmission networks and, more particularly, to networks in which particular data sequences are to be detected and/or eliminated.

An ever increasing number of digital networks utilize telephone long lines to interconnect computers in geographically distant locations. The telephone lines in question include $T_1$ lines and fiber optic lines. These systems include repeaters which compensate for transmission losses on the lines and receivers associated with various network devices. These repeaters and receivers must remain synchronized with each other. This synchronization is maintained through the detection of the transitions between 1 and 0 bits in the data at each repeater location. If data having long runs of 1s or 0s is sent on such a long line, time synchronization may be lost. This loss of synchronization will jeopardize network integrity, possibly resulting in failure of the entire long line transmission system.

Long runs of 1s or 0s are not a problem in systems carrying only voice data, since there is always enough static on the lines to provide the transitions in question. In addition, consecutive time slots on the $T_1$ lines are assigned to different users. Hence, no one user can control more than a small fraction of the capacity of the line.

Computer data, however, often includes long runs of 1s and 0s. In addition, advanced digital networks may assign a large fraction of the channel capacity to a single user, thereby allowing a single user sending digital data to force a long string of 1s or 0s onto the transmission lines. As a result, some method of converting such data runs to non-destructive runs for transmission on the long lines is needed. Several prior art techniques have addressed this problem. Some digital networks assemble the user data into packets before transmitting that data on the long lines. In this type of system, overhead bits are added to the user data to guarantee that even if a user transmits all 0s, a run of more than some predetermined number of 0s on the long line is not possible.

such schemes guarantee that no long runs of 0s or 1s are transmitted, they waste transmission capacity. For example, in some $T_1$ based digital networks, data is transmitted as 8-bit packets in which user data forms 7 bits of the packet and the 8th bit is forced to be a "1". This solution wastes of 1/8th of the capacity of the long line.

A second type of solution to this problem involves scrambling the user data sequence before transmission on the long lines, and then descrambling it upon receipt at the other end. The scrambling algorithm converts long runs of 1s and 0s into sequences that include the requisite density of 1-0 transitions. For example, in one proposed system, each bit of the user data stream is paired with a bit from a scrambling sequence. The pair of bits in question are then added modulo 2 to form a bit of the scrambled output sequence. The scrambling sequence in question consists of a circular list of N bits. That is, bit 1 of the scrambling sequence is added to bit 1 of the user data to form bit 1 of the scrambler output. Then bit 2 of the scrambling sequence is added to bit 2 of the user data to form bit 2 of the scrambler output, and so on until bit N is used. Then the scrambling sequence is replayed, i.e., bit 1 of the scrambling sequence is added to bit N+1 of the user data to form bit N+1 of the scrambler output.

Although this system prevents long runs of 1s and 0s in the user data from being repeated on the long lines, a user, particularly a malicious one, can still cause long runs of 1s and 0s to be sent on the long lines. If the user data contains a bit sequence which matches that of the scrambling sequence paired thereto, a run of 0s will be generated. Similarly, if the user data contains a bit sequence that matches the 1s complement of the scrambling sequence, a run of 1s will be generated.

The probability that a string of 1s or 0s long enough to destroy synchronization will occur depends on how long a sequence the system can tolerate. For example, in fiber optic long lines, runs of a maximum of 60 0s can be tolerated. In this case, one would need a user sequence containing a 60-bit sub-sequence of the scrambling sequence to destroy synchronization. Such a sequence will be referred to as an illegal sequence in the following discussion. If all user data sequences were equally likely, it would take hundreds of years, on average, to encounter an illegal sequence.

Unfortunately, not all user data sequences are equally likely. Computer and telecommunications systems have long been plagued by malicious users who attempt to disable the systems. If such an individual was privy to the scrambling sequence, he could disable the system by sending the sequence in question in such a manner that it would be likely to match up with the scrambling sequence, thus causing a run of 0s or 1s to be placed on the long lines. Given the number of individuals involved in maintaining telecommunications systems, it is unlikely that the scrambling sequence could be kept secret; hence, some means of preventing system sabotage by malicious individuals sending the scrambling sequence is needed.

One proposed solution to this problem is to use a self-synchronizing pre-scrambling scheme in which the sequence leading to a run of 0s or 1s of the critical length can not be predicted. For example, a prescrambler is placed in series with each of the above described scramblers. The pre-scrambler executes an algorithm which depends upon the contents of the prescrambler prior to the arrival of the user data sequence. The encrypted pre-scrambled data is then scrambled a second time by a standard network scrambler, transmitted on the long line, and descrambled by a network descrambler at the end of the long line. The data is then further descrambled by a second decoder which decrypts the code utilized by the unpredictable pre-scrambler.

This solution has a number of drawbacks.

First, the pre-scrambler and corresponding decryption circuitry must be installed in a number of transmitters and receivers in the network. This significantly increases the cost of the network. Second, transmission errors may be multiplied by the decryption circuitry unless error-correcting bits are included in the encrypted data. The error-correcting bits utilize transmission capacity which could otherwise carry user data; hence, the overall capacity of the system is reduced.

Third, this solution does not permit the detection of illegal sequences. Ideally, one would like to detect an illegal sequence at its point of origin and then sound an alarm. The possibility of capture would then discourage malicious individuals from attempting to disable the telecommunications system. The above described pre-scrambling scheme does not test for any specific sequence.

Finally, the potential for a malicious individual or pure chance to generate an illegal sequence is not completely eliminated by the prescrambler. There is always a possibility that the malicious individual, either by chance or by gaining knowledge of the pre-scrambler contents, could cause an illegal sequence to be generated at the output of the pre-scrambler. The result could be a complete failure of the telecommunications system because of loss of synchronization.

Broadly, it is an object of the present invention to provide an apparatus and method for preventing illegal sequences from being transmitted on a telecommunications link.

It is a further object of the present invention to provide a method and apparatus which does not reduce the data carrying capacity of the telecommunications link.

It is another object of the present invention to provide a method and apparatus which does not result in error multiplication in the data transmitted on the telecommunications link.

It is a still further object of the present invention to provide a method and apparatus which guarantees that an illegal sequence can not be generated from any possible input sequence.

It is yet another object of the present invention to provide a method and apparatus that detects illegal sequences.

It is a still another object of the present invention to provide a method and apparatus for sounding an alarm when such an illegal sequence is detected.

These and other objects of the present invention will become apparent to those skilled in the art from the following detailed description of the invention and the accompanying drawings.

SUMMARY OF THE INVENTION

Figure 1:
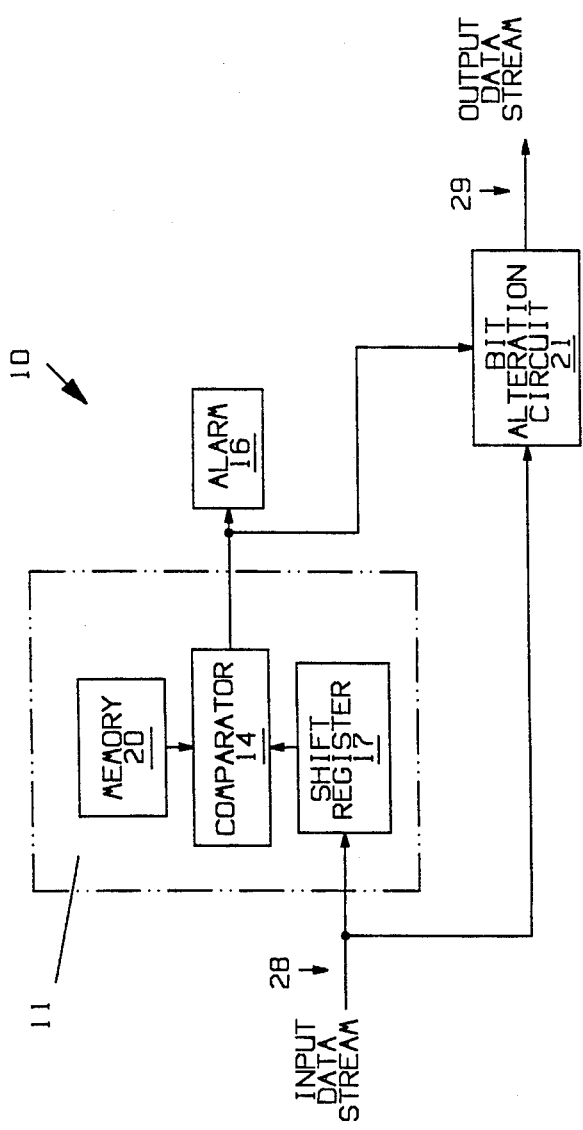
FIG. 1 is a block diagram of an interface circuit according to the present invention.

The present invention comprises an interface circuit for converting an input data sequence to an output data sequence. The input and output data sequences have the same number of bits. The output data sequence differs from the input data sequence if the input data sequence matches an illegal sequence comprising a predetermined sequence of N data bits. The preferred embodiment of the invention receives a bit serial input data sequence. The invention includes a memory for storing at least one of the last N data bits received and circuitry for determining if the previously received N data bits match said illegal sequence. If the previously received N bits match the illegal data sequence, circuitry included in the invention alters one of the data bits stored in the memory. The data bits stored in the memory are outputted as the output data sequence.

DETAILED DESCRIPTION OF THE INVENTION

The present invention comprises an interface circuit for preventing illegal sequences of data bits from being transmitted over a network telecommunications link. As noted above, digital networks in increasing numbers are utilizing telephone long lines to interconnect computers in geographically distant locations. The repeaters interspersed along the T₁ and fiber optic telephone long lines in these network systems must remain in time synchronization in order that the data can be deciphered upon receipt.

In a digital transmission system, the receiver needs a timing signal to sample the incoming data bit stream. It uses this timing signal to identify bit boundaries and decode the data properly. A clock recovery circuit at the receiver is able to extract the right timing signal from the incoming data stream only if there are a sufficient number of 0-1 or 1-0 bit transitions in the received signal. A long run of consecutive 1s or 0s will prevent the clock recovery circuit from extracting the timing signal, thus jeopardizing network integrity.

A commonly employed method for preventing long runs of 1s or 0s from being transmitted over network lines is to scramble the user data prior to transmission, and to descramble it upon receipt. The scrambling algorithm converts long runs of 1s and 0s into sequences that include the requisite density of 1-0 transitions. However, if a malicious user were to mimic the scrambling sequence (or the 1s complement thereof), a long run of 0s or 1s would be generated. Consequently, it is essential that any device designed to prevent the transmission of illegal sequences must be able not only to detect these sequences, even in cases where the scrambling sequence has been duplicated, but also must be able to modify the data in such a way that a long run of 1s or 0s will never be transmitted.

The illegal sequence detector of the present invention is normally placed immediately following the input data port in the network telecommunications link. The illegal sequence detector examines the incoming data stream to determine whether any sequence of bits in the data stream matches a sequence in the specified illegal bit pattern. The illegal pattern so detected might be a consecutive string of 1s or 0s of specified length. Or it might be any of a series of specified patterns stored in the memory of the device. Or the illegal pattern might be a sequence of bits which, when scrambled according to a predetermined protocol, would produce a consecutive string of 1s or 0s of specified length. Since a telecommunications data field typically contains 512 bits of data, the illegal sequence to be detected might be as many as 512 bits long, or might be a shorter sub-sequence thereof, depending on the number of consecutive illegal bits that the network under discussion can tolerate.

An apparatus for a basic illegal sequence detector according to the present invention is illustrated in FIG. 1 at 10. Apparatus 10 operates on an input data sequence on line 28 to provide an output data sequence on line 29. For the purposes of this discussion it will be assumed that these data sequences are bit serial in nature. Embodiments that operate on data streams of other formats, such as byte serial, will be apparent to those skilled in the art. The input data sequence is examined by a detection circuit 11, which compares the bits of the input data sequence with those of one or more stored illegal data sequences. For simplicity, the first case to be described is one in which a single illegal N-bit data sequence is to be detected and altered prior to transmission on the transmission long lines.

As each bit of the input data stream is received by detection circuit 11, detection circuit 11 compares that bit, along with the previously received N-1 bits, to the illegal sequence in question. An N-bit shift register 17 and memory 20 might be utilized for this purpose. Each bit of the input data sequence is shifted in turn into shift register 17. As each bit is input, the contents of shift register 17 are compared to the illegal sequence stored in memory 20 by a comparator 14.

Each bit of the input data stream is also input to a bit alteration circuit 21 which stores the current data bit for a period sufficient to permit the above described comparison to take place. Bit alteration circuit 21 is preferably a one-bit shift register. The output of circuit 21 is the output data sequence supplied on line 29. If the N bits of the input data sequence currently stored in detection circuit 11 match the illegal sequence, comparator 14 outputs a signal to circuit 21 which causes circuit 21 to complement the bit currently stored therein. In other words, if the data bit stored in circuit 21 were a 0, this bit would be changed to a 1 before outputting it on line 29; conversely, if the stored bit were a 1, it would be changed to a 0. This process of complementing the most recent data bit converts the illegal data sequence to a legal data sequence. The output of comparator 14 may also be used to trigger an alarm circuit 16.

Figure 2:
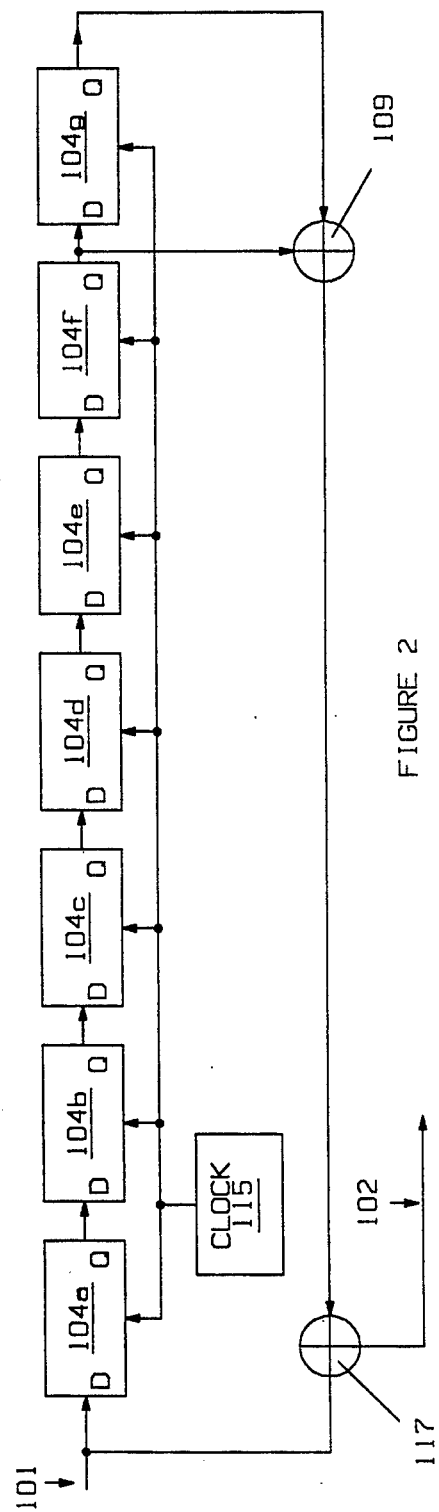
FIG. 2 is a schematic diagram of a circuit according to the present invention for detecting a sub-sequence of the SONET sequence.
Figure 4:
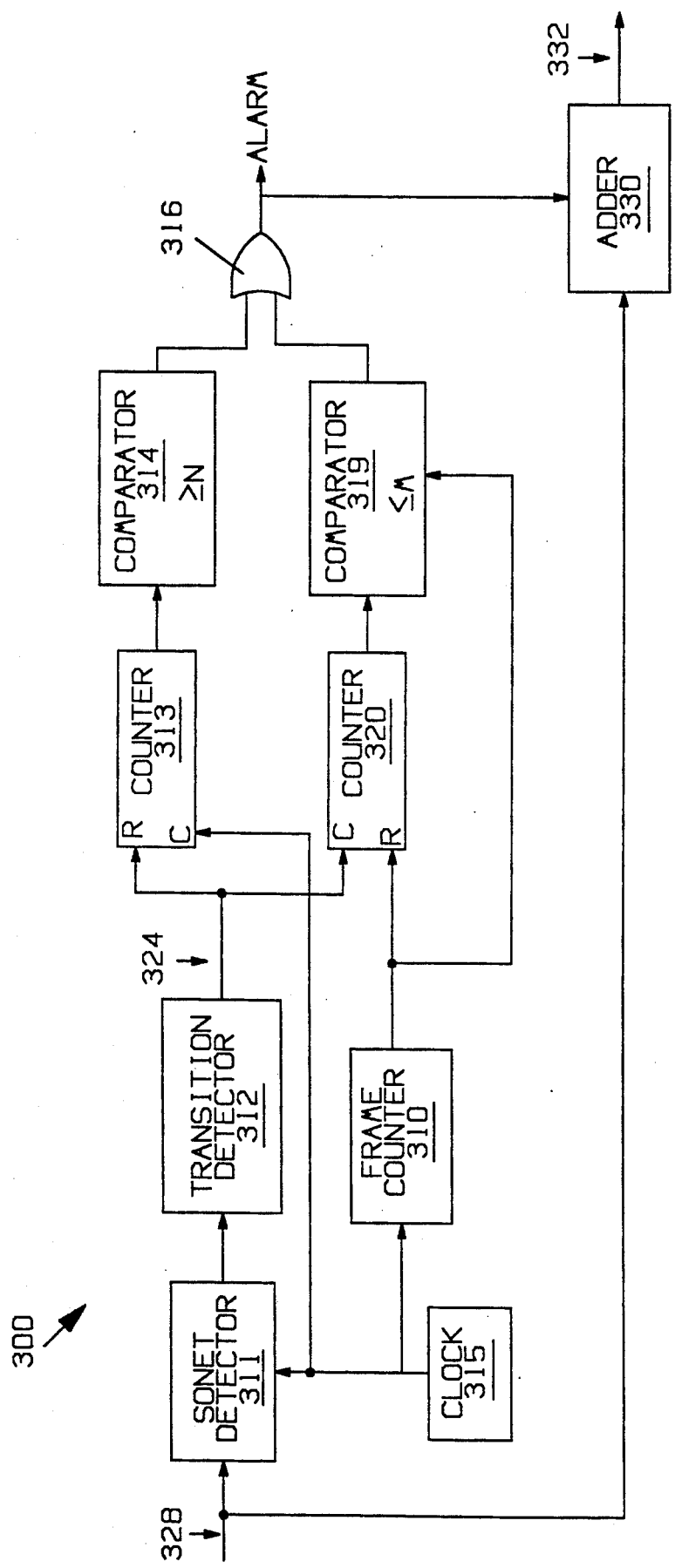
FIG. 4 is a block diagram of a 2-criteria interface circuit according to the present invention.

The preferred embodiment of the present invention is intended for use in telephone systems which utilize a scrambling sequence referred to as the SONET sequence. In this application, two illegal data sequences must be detected. The first illegal data sequence is any sub-sequence of the SONET sequence having a length greater than or equal to N bits. The second illegal data sequence is the is complement of the first sequence. As noted above, either of these sequences, when scrambled by a SONET scrambler in the telephone system, may lead to a data stream have an insufficient density of 0-1 transitions. Such data streams have the potential for causing synchronization errors on the transmission lines. The data bits comprising a SONET sequence satisfy a particular recursive relationship, discussed below, which permits both the storage requirements and the complexity of the detection circuit 11 to be significantly reduced. An embodiment of the present invention that operates on illegal data sequences satisfying such a recursive relationship is illustrated in FIGS. 2 and 4.

The period of the SONET scrambling pattern is bits. To take a specific example, assume the SONET pattern to be:

$$s_0, s_1, s_2, s_3, \ldots s_{124}, s_{125}, s_{126}.$$

This pattern can occur at any arbitrary phase. For example:

$$s_i, s_{i+1}, s_{i+2}, s_{i+3}, \ldots s_{i+124}, s_{i+125}, s_{i+126},$$

where $0 \leq i \leq 126$. Thus, taking into account the 1s complement of the SONET scrambling pattern, there are 254 different bit sequences that the illegal sequence detector in this embodiment of the present invention must recognize. If the embodiment described above with reference to FIGS. 2-3 were utilized for this task, a large amount of memory would be needed. In addition, comparator 14 would need to complete all 254 comparisons in the time between successive bits arriving on line 28. These speed and memory requirements detract from the usefulness of the embodiment in question. Hence, a second embodiment of the present invention will now be described which provides for detection of sub-sequences of sequences such as the SONET sequence while requiring considerably less expensive computational hardware.

This second embodiment of the present invention makes use of the following recursive relationship which is satisfied by the SONET sequence:

$$s_n = s_{n-6} + s_{n-7}. \tag{1}$$

This recursive relationship can be utilized in detecting illegal sequences in the illegal sequence detector of the present invention.

FIG. 2 illustrates a detection circuit 111 for use in detecting a sub-sequence of the SONET sequence or the complement thereof. The output of detection circuit 111 will be 0 if the next bit received on input line 101 together with the preceding 7 bits satisfies Eq(1). The output will be a 1 if the sequence in question is a sub-sequence of the complement of the SONET sequence. Detector circuit 111 includes a 7-stage shift register comprising stages 104a-g connected in series. The input data on line 101 is connected to the input of the first stage 104a and is also connected to one input of adder 117. The data bits are conveyed through the series of stages, advancing one bit at the occurrence of each pulse from clock 115. At the time when bit n has arrived on line 101, bits n-6 and n-7 are stored in the last 2 stages 104f and 104g. These 2 bits are added (modulo 2) in adder 109. The output of adder 109 is connected to the second input of adder 117. Thus the sum of the n-6th and n-7th bits of the input sequence is added to bit n of the sequence by adder 117. If the input sequence happened, either by chance or intent, to mimic the SONET scrambler sequence (or its 1s complement), the output of adder 117, on line 102, would be a consecutive string of 0s (or a consecutive string of 1s).

Figure 3:
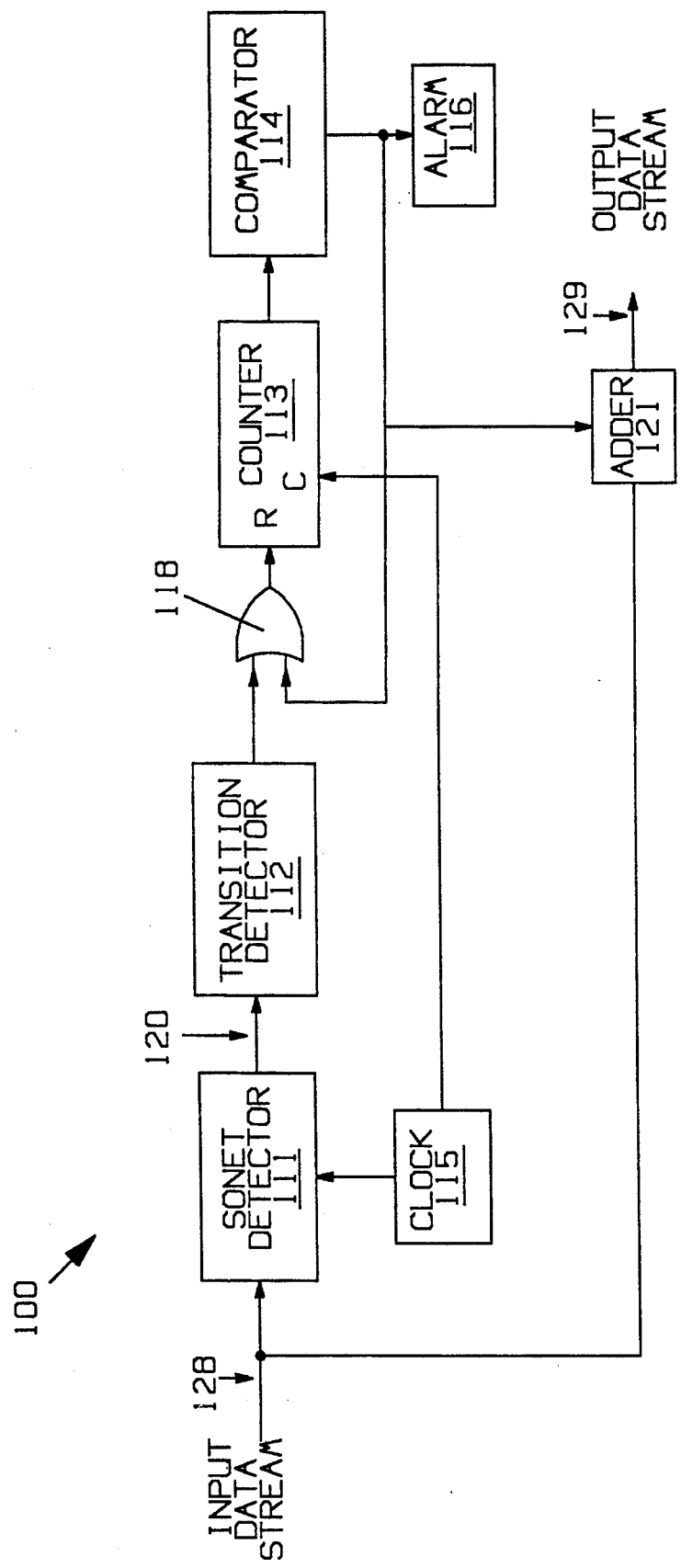
FIG. 3 is a block diagram of an interface circuit according to the present invention for detecting and eliminating a sub-sequence of the SONET sequence.

A block diagram of an interface apparatus for detecting the presence of illegal SONET sub-sequences according to the present invention is shown in FIG. 3 at 100. Apparatus 100 operates on an input data sequence on line 128, and provides an output data sequence on line 129. The input data stream on line 128 is input to the SONET detector circuit 111 described above. Clock 115 provides the timing pulses synchronizing the movement of the data stream through the device. At each input pulse from clock 115, the next data bit in the data stream enters detector 111 at its input. Thus, there are always 7 data bits in detector 111, but the segment of the data stream being examined is advanced by one bit with each clock pulse. As the data stream is advanced through detector circuit 111, an illegal bit sequence or its 1complement input to detector 111 will cause detector 11 to produce consecutive 0s or 1s at the output 120 of detector 111.

The number of consecutive bits that a network can tolerate without entering a 1-0 or 0-1 transition varies from system to system. Assume that L such consecutive non-transition bits can be tolerated by the network in which the illegal sequence detector of the present invention is operating. Thus, L such consecutive bits must be detected by the illegal sequence detector of the present invention before it is necessary to modify a data bit and to sound the alarm.

Transition detector 112 produces an output pulse when it detects a 1-0 and 0-1 transitions on input line 120. These pulses are connected to the reset input of a counter 113 via OR gate 118. Counter 113 counts the number of consecutive data bits clocked through the device *without* the occurrence of a transition. Each time it a transition is detected by transition detector 112, transition detector 112, via OR gate 118, resets counter 113 to zero. Thus, the number of counts accumulated in counter 113 at any given time is the number of consecutive data bits of the illegal sequence that have been detected thus far. Comparator 114 compares the value accumulated in the counter to N, the limit value that has been set for the system.

When the comparator determines that N consecutive bits of an illegal sequence have been detected, its output goes to 1. This output is connected to one input of adder 121. The other input of adder 121 is the incoming data stream. Thus, the incoming data passes through adder 121 unchanged if fewer than N bits of an illegal sequence have been detected. But the occurrence of the Nth bit creates a condition that will cause the N+1st bit to be complemented. In other words, if the string of illegal bits had produced N sequential 0s at the output of the recursive relation detector, the N+1st data bit would be changed such that it would produce a 1. If the string of illegal bits had produced N consecutive 1s at the output of the recursive relation detector, the N+1st data bit would be changed such that it would produce a 0.

It will be apparent to those skilled in the art that the bit limit value set at the comparator, i.e., the number of consecutive bits of an illegal sequence to be detected before modifying a bit and sounding the alarm, might be set to any desired value, this value being at least 7 bits smaller than the number of consecutive illegal bits the network can tolerate.

Though the above example showed the N consecutive 0s generated by N consecutive bits of a SONET sequence, it should be clear to those skilled in the art that any other bit sequence could have been similarly detected, requiring only that the output of the sequence detection circuit be 1 whenever the n data bits under examination fit the bit pattern defined as an illegal sequence, and that this output be 1 whenever the n bits under examination do not fit the bit pattern defined as an illegal sequence.

Figure 5:
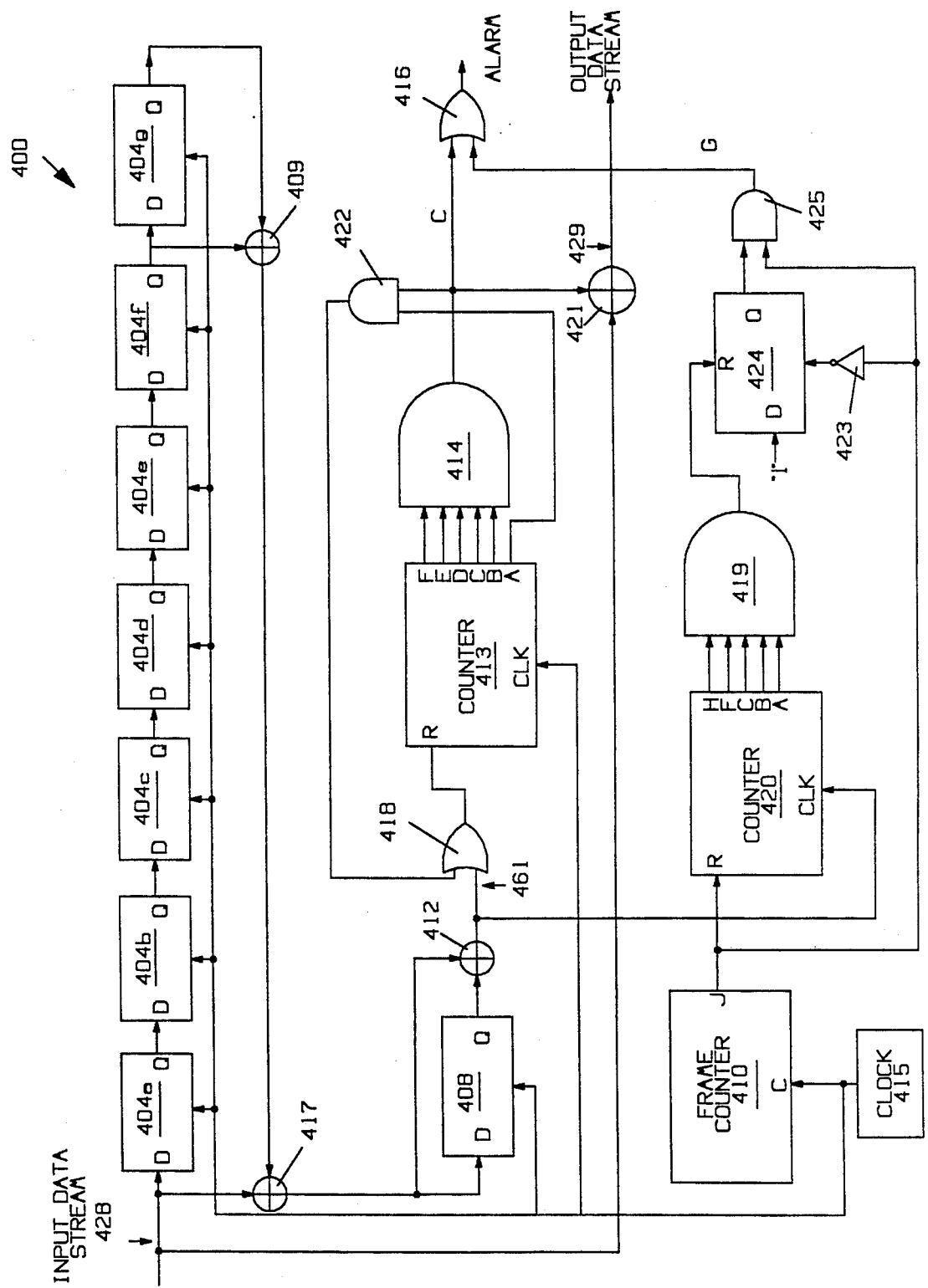
FIG. 5 is a schematic diagram of a 2-criteria interface circuit according to the present invention.

According to another embodiment of the present invention, an illegal sequence is defined by two independent criteria. A bit sequence is considered to be illegal if *either* of two criteria is satisfied. Such a 2-criteria illegal sequence detector according to the present invention is illustrated in the block diagram of FIG. 4 at 300. The first of these criteria is identical to that described above, i.e., any sequence of input data bits resulting in N consecutive non-transitions at the output of the transition detector, point C in FIG. 5, is an illegal sequence. The second criterion defining an illegal sequence is the occurrence of fewer than m transitions for each M data bits transmitted. The values for M and m would be selected to have m significantly larger than the number of transitions expected in each M bits of a random input data stream. This second criterion would catch the exceedingly unlikely (yet possible) occurrence of a data sequence which does not mimic the scrambling sequence, but which nevertheless has an insufficient density of 1-0 and 0-1 transitions to insure network integrity.

In the block diagram of FIG. 4, the input data stream at point 328 is fed to a SONET detector 311, which operates in the a manner analogous to the SONET detectors described above. The output of SONET detector 311 is used as input to a transition detector 312, which detects the 1-0 and 0-1 transitions. The output signal from transition detector 312 is used, as before, to reset counter 313, which counts the number of consecutive bits of input on line 328 which do not produce a transition at the output of SONET detector 311. In addition, the output of transition detector 312 is connected to the count input of a second counter 320. The reset signal to counter 320 is generated by a frame counter 310, which provides a reset pulse every M bit intervals. A typical value for M would be 512, the length of a data frame.

In a manner analogous to that described above with reference to FIG. 3, comparator 314 generates an output of 1 when counter 313 has counted N consecutive non-transition bit intervals. The output of comparator 314 is connected to one input of OR gate 316. The output of OR gate 316 causes the alarm to sound and is used to as one input to adder 330. The output of adder 330 comprises the output data stream on line 332.

The output of counter 320 is input to a second comparator 319. Comparator 319 is set to produce an output of 1 if the accumulated counts upon the arrival of the next reset pulse is less than or equal to a predetermined value m. A typical value for m in this case would be 166, a number far lower than the number of transitions expected from 512 bits of a random input data stream. The output of comparator 319 comprises the second input to OR gate 316. Thus, the occurrence of fewer than m transitions in the preceding M bit intervals will likewise sound the alarm and cause an alteration in the output data stream on line 332.

A more detailed schematic diagram of the circuit shown in FIG. 4 is shown at 400 in FIG. 5. Circuit 400 operates on an input data sequence on line 428 to provide an output data sequence on line 429. The circuitry in the upper portion of FIG. 5 is analogous to the SONET detectors and first criterion detection circuitry described above with reference to FIGS. 2-4 and is hence numbered in an analogous manner. The circuit elements in FIG. 5 that are the same as in FIG. 4, have labels having the same last two digits. In the particular embodiment shown in FIG. 5, this portion of the circuitry detects the occurrence of 62 consecutive bits which comprises either a sub-sequence of the SONET sequence or the complement of the SONET sequence. The circuitry in question sounds the alarm, and causes the next bit to be complemented so as to destroy the sub-sequence.

In the particular embodiment shown in FIG. 5, the circuitry in the lower portion of said figure serves to detect the occurrence of fewer than 166 transitions in any 512-bit data frame. An 8-bit counter 420 counts the transitions detected at point 461, the output of the transition detector formed by flip-flop 408 and adder 412. A pulse generated by a 10-bit frame counter 410, which counts down using the clock pulses generated by clock 415, resets counter 420 once every 512 bit intervals. This frame pulse, in addition to resetting counter 420, is connected to one input of AND gate 425. The other input to AND gate 425 is the output signal from a single state shift register 424.

It can be seen that the state of shift register 424 is the key to determining whether an illegal sequence according to the second criterion has occurred. The input of shift register 424 is always set to 1. This 1 will appear at the output of shift register 424 only under the appropriate set of conditions. The output of frame counter 410 is connected, through inverter 423, to the clock input of shift register 424. Thus, at the end of each frame pulse, inverter 423 pulses the clock input of shift register 424, causing the 1 at its input to be transferred to its output. As mentioned above, this output is connected to one input of AND gate 425. At this moment, however, the other input of AND gate 425 is at 0, since the frame pulse has terminated.

When counter 420 has accumulated 166 counts without being reset by a frame pulse from counter 410, the output of AND gate 419 will reset shift register 424, making its output 0. Under these conditions, when the next frame pulse occurs, only one input of AND gate 425 will be at 1. However, if counter 420 has not accumulated 166 counts before the occurrence of the next frame pulse, shift register 424 will still have a 1 at its output. This 1 will appear at one input of AND gate 425. The frame pulse, when it occurs, will present a 1 at the other input of AND gate 425. With both inputs at 1, the output of AND gate 425, at point G, will also go to 1. This is an indication that the second criterion for declaring the occurrence of an illegal sequence has been met, i.e., that fewer than 166 transitions have occurred during the last frame interval.

Although an output indicating that the second criterion has been met is only shown as causing an alarm in FIG. 5, it will be apparent to those skilled in the art that this output could be used as the input to adder 421 in place of the output of AND circuit 414. In this case, the last bit of the output data sequence would be altered to provided an additional 1-0 transition.

When an illegal sequence is detected by the preferred embodiment of the present invention, a one-bit alteration is made in the data sequence sent by the computer user. Hence, an illegal sequence results in a one-bit error. The probability of a computer user accidentally generating a 60-bit sub-sequence of the SONET sequence is much smaller than the normally encountered error rates on the communications link used to connect the user to the central telephone office. Hence, this error rate is of little consequence.

The above described embodiments of the present invention have utilized bit alteration circuits (See FIG. 1) which store the last bit received and which alter this bit if it was the last bit of an illegal sequence. It will be apparent to those skilled in the art that bit alteration circuits in which a plurality of data bits are stored could be utilized. Furthermore, the bit altered need not be the last bit received. Any single bit or group of bits stored in the bit alteration circuit may be altered, provided the alteration does not result in another illegal sequence.

Accordingly, an interface circuit has been described for preventing illegal data sequences from being transmitted over a network telecommunications link. It will be apparent to those skilled in the art that various modifications may be made without departing from the invention as taught herein. Hence, the present invention is to be limited only by the following claims:

What is claimed is:

1. A interface circuit for converting an input data sequence to an output data sequence, said input and output data sequences comprising the same number of bits, said output data sequence differing from said input data sequence if said input data sequence matches an illegal sequence comprising a predetermined sequence of N data bits, said interface circuit comprising:
   means for receiving said data sequence;
   means for storing at least one of the last N data bits received by said receiving means;
   means for determining if the previously received N data bits match said illegal sequence;
   means responsive to said determining means for altering one of the said data bits stored in said storing means if said data determining means determines that said previously received N data bits match said illegal sequence; and
   means for outputting the data bits stored in said storing means to form said output data sequence.

2. A interface circuit for converting an input data sequence to an output data sequence, said input and output data sequences comprising the same number of bits, said output data sequence differing from said input data sequence if said input data sequence matches an illegal sequence comprising a predetermined sequence of N data bits, said interface circuit comprising:
   means for receiving said data sequence;
   means for storing at least one of the last N data bits received by said receiving means;
   means for determining if the previously received N data bits match said illegal sequence;
   means responsive to said determining means for altering one of the said data bits stored in said storing means if said data determining means determines that said previously received N data bits match said illegal sequence; and
   means for outputting the data bits stored in said storing means to form said output data sequence,
   wherein said determining means generates an output signal having a logical value of "1" if said previously received N data bits match said illegal sequence and "0" otherwise, and wherein said storing means comprises a one bit adder for calculating the sum modulo 2 of first and second inputs, said first input being the last data bit received by said receiving means and said second input being said output signal, the output of said adder being said output data sequence.

3. The interface circuit of claim 1 wherein said determining means further comprises means for generating an alarm signal in response to said output signal having a logical value of 1.

4. A interface circuit for converting an input data sequence to an output data sequence, said input and output data sequences comprising the same number of bits, said output data sequence differing from said input data sequence if said input data sequence matches an illegal sequence comprising a predetermined sequence of N data bits, said interface circuit comprising:
   means for receiving said data sequence;
   means for storing at least one of the last N data bits received by said receiving means;
   means for determining if the previously received N data bits match said illegal sequence;
   means responsive to said determining means for altering one of the said data bits stored in said storing means if said data determining means determines that said previously received N data bits match said illegal sequence; and
   means for outputting the data bits stored in said storing means to form said output data sequence, wherein said illegal sequence satisfies a recursive relation of the form $$s_n = F(s_{n-1}, s_{n-2}, \ldots, s_{n-k})$$

wherein $S_n$ is the nth bit of said illegal sequence, k is a predetermined integer, and F is a predetermined function, and wherein said determining means comprises:
a shift register including k stages;
means for shifting each data bit received by said receiving means into the first stage of said shift register upon receipt of said data bit;
means for computing a predetermined mathematical function of the data bits stored in said shift register to produce a numerical result after each data bit is received by said receiving means;
means for counting the number of successive data bits received for which said numerical result did not change; and
means for generating said output signal if said number exceeds a predetermined number.

5. The interface circuit of claim 4 wherein k is equal to 7 and wherein $$s_n = s_{n-6} + s_{n-7}.$$

6. A circuit for determining if an input data sequence includes a sub-sequence of an illegal sequence satisfying a recursive relation of the form $$s_n = F(s_{n-1}, s_{n-2}, \ldots, s_{n-k})$$

wherein $S_n$ is the nth bit of said data sequence, k is a predetermined integer, and F is a predetermined function, circuit comprising:
means for receiving said input data sequence;
a shift register including k stages;
means for shifting each data bit received by said receiving means into the first stage of said shift register upon receipt of said data bit;
means for computing a predetermined mathematical function of the data bits stored in said shift register to produce a numerical result dependent upon said function F after each bit of said input data sequence is received by said receiving means;
means for counting the number of successive input data bits received for which said numerical result did not change; and
means for generating said output signal if said number exceeds a predetermined number.

* * * * *

UNITED STATES PATENT AND TRADEMARK OFFICE
CERTIFICATE OF CORRECTION

PATENT NO. : 5,023,612
DATED : June 11, 1991
INVENTOR(S) : Kuo-Kui Liu It is certified that error appears in the above-identified patent and that said Letters Patent is hereby corrected as shown below:

Column 1, line 46, before "such" insert "Although".
Column 5, line 38, after "the" delete "is" and insert therefor --1s--.
Column 5, line 41, delete "have" and insert therefor --having--.
Column 5, line 52, before "bits" insert --127--.
Column 6, line 59, delete "1complement" and insert therefor --1s complement--.
Column 6, line 60, delete "11" and insert therefor --111--.
Column 6, line 63, delete "entering" and insert therefor --encountering--.
Column 7, line 9, delete "it" before "a".
Column 8, line 5, delete "the" before "a".
Column 9, line 37, delete "provided" and insert therefor --provide--.

Signed and Sealed this

Ninth Day of March, 1993

*Attest:*

STEPHEN G. KUNIN

*Attesting Officer*      *Acting Commissioner of Patents and Trademarks*